United States Patent [19]

Helms

[11] Patent Number: 4,507,611
[45] Date of Patent: Mar. 26, 1985

[54] METHOD FOR DETECTING SURFACE AND SUBSURFACE ANOMALIES OF THE EARTH USING VERTICAL CURRENT MEASUREMENTS

[76] Inventor: Ronald L. Helms, 2936 Chain Bridge Rd., P.O. Box 384, Oakton, Va. 22124

[21] Appl. No.: 404,459

[22] Filed: Aug. 2, 1982

Related U.S. Application Data

[63] Continuation of Ser. No. 876,163, Feb. 8, 1978, abandoned.

[51] Int. Cl.³ ............... G01V 3/08; G01V 3/06; G01V 3/15
[52] U.S. Cl. ............... 324/323; 324/72; 324/344; 324/348
[58] Field of Search ............... 324/323, 326, 330, 334, 324/344, 347–349, 72

[56] References Cited

U.S. PATENT DOCUMENTS

| | | | |
|---|---|---|---|
| 1,492,300 | 4/1924 | Lowy | 324/330 |
| 2,124,825 | 7/1938 | Machts et al. | 324/345 X |
| 2,659,863 | 11/1953 | Stanton | 324/348 X |
| 2,784,370 | 3/1957 | Morrison | 324/323 |
| 3,087,111 | 4/1963 | Lehan et al. | 324/344 |
| 3,126,510 | 3/1964 | McLaughlin et al. | 324/345 |
| 3,136,943 | 6/1964 | Slichter | 324/344 |
| 3,391,334 | 7/1968 | Ruehle | 324/344 |
| 3,398,356 | 8/1968 | Still | 324/344 X |
| 3,662,260 | 5/1972 | Thomas et al. | 324/344 |
| 3,701,940 | 10/1972 | Nilsson | 324/357 |
| 3,763,419 | 10/1973 | Barringer | 324/334 |
| 3,849,722 | 11/1974 | Nilsson | 324/357 |
| 3,911,435 | 10/1975 | Mardon et al. | 324/344 X |
| 3,942,101 | 3/1976 | Sayer et al. | 324/344 |
| 3,976,937 | 8/1976 | Hearn | 324/331 |
| 4,041,372 | 8/1977 | Miller et al. | 324/357 |

FOREIGN PATENT DOCUMENTS

| | | | |
|---|---|---|---|
| 156696 | 4/1922 | United Kingdom | 324/330 |
| 138673 | 6/1959 | U.S.S.R. | 324/344 |

Primary Examiner—Gerard R. Strecker
Attorney, Agent, or Firm—Wender, Murase & White

[57] ABSTRACT

A method for locating and evaluating surface and subsurface anomalies. Solar wind results in a multi-frequency, high energy ionic impingement at the terrestrial poles of the earth. Monitoring the activity of the solar wind allows the determination as to when the activity produces a vertical alternating current leakage (solar alternating current) due to the ionic impingement. When the vertical current leakage is in a proper range which can be measured and which reflects and represents surface and subterranean anomalies, a predetermined region of the earth to be prospected is traversed. Local variations which occur in the amplitude, frequency and frequency modulation of the vertical alternating current leakage due to the ionic impingement of solar winds at the terrestrial poles (solar alternating current) is measured. The measurements are recorded in correlation with the spatial relation to the points of measurement to determine significant measurements indicative of surface and subterranean anomalies.

12 Claims, 1 Drawing Figure

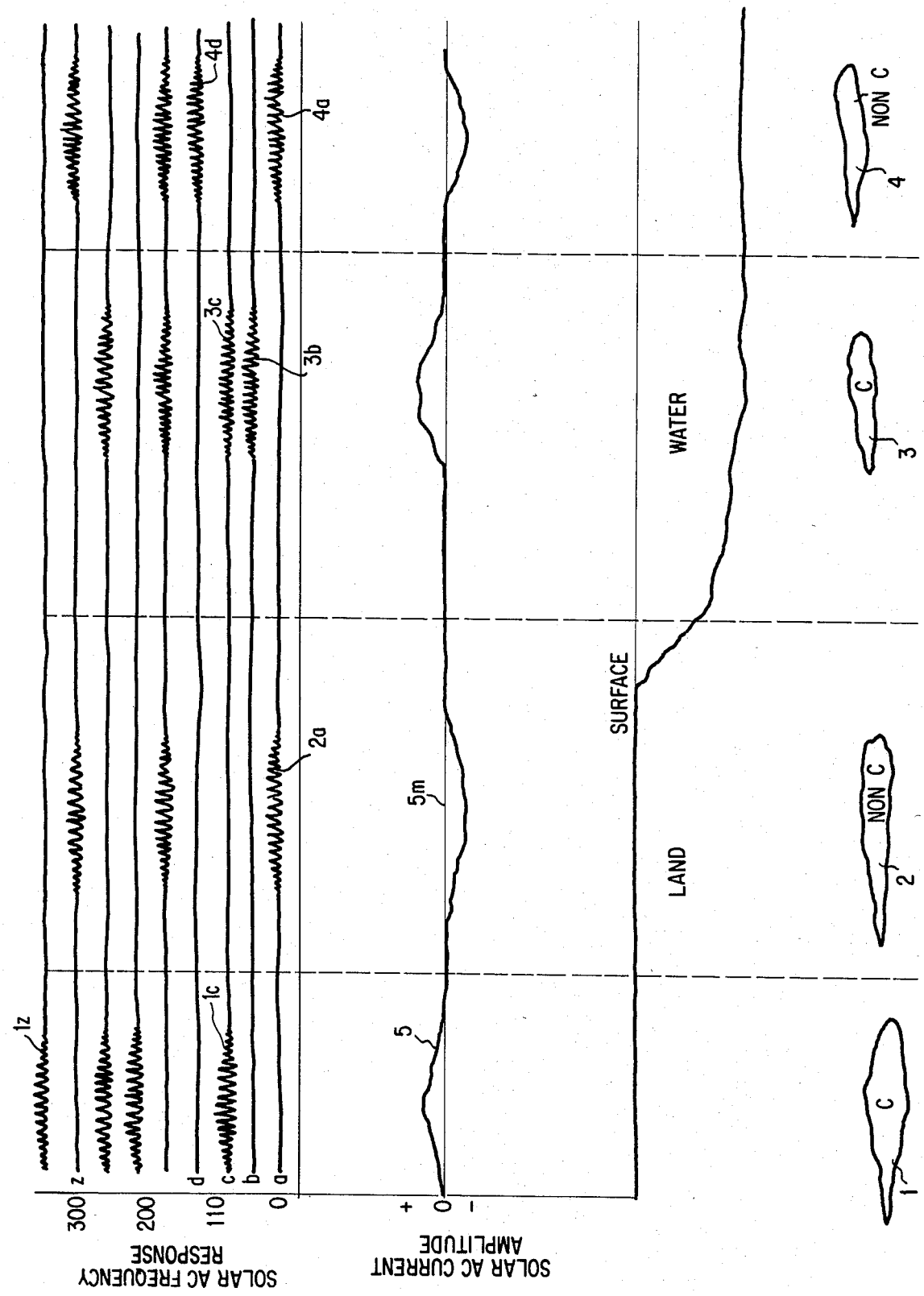

METHOD FOR DETECTING SURFACE AND SUBSURFACE ANOMALIES OF THE EARTH USING VERTICAL CURRENT MEASUREMENTS

This is a continuation of application Ser. No. 876,163 dated Feb. 8, 1978, now abandoned.

BACKGROUND OF THE INVENTION

1. Field of the Invention

Solar wind results in a multi-frequency, high energy ionic impingement of the terrestrial poles of the earth. These ions which impinge upon the earth in turn leak from non-pole areas in a weak low noise manner. The leakage provides a measurable paramter which, when recorded, permits the location and identification of surface and subsurface objects or deposits.

The invention generally relates to geophysical prospecting and, more specifically, relates to a method for locating and identifying surface and subsurface objects and deposits, natural and man-made, through sensing, recording and analyzing variations of the earth's vertical electrical alternating current.

2. Description of the Prior Art

Many techniques are known in the prior art to perform geophysical prospecting. For example, Ruehle, et al. in U.S. Pat. No. 3,363,457, teaches that the measurement of radiant energy from subsurface formations enables geophysical prospecting. Weber, in U.S. Pat. No. 4,044,299, teaches a prospecting technique which includes the use of an inductive exciter which induces alternating current energy into the area and structure of the earth which is to be observed. Measurement of the induced current energy allows the determination of the underground environment of the area.

A method and apparatus for measuring subsurface electrical impedance utilizing first and second successively transmitted signals at different frequencies is taught by Madden, et al. in U.S. Pat. No. 3,525,037.

In U.S. Pat. No. 3,942,101, Sayer's geophysical prospecting utilizes a distortion of the atmospheric electrostatic potential gradient which is suggested to be a result of the Nernst effect. Sayer teaches that the distortion provides a means for locating subterranean sources of geothermal energy.

The earth's electromagnetic field also has naturally occurring alterations of the type known as "magnetic noise". Slichter, in U.S. Pat. No. 3,136,943, discloses that such noise is the product primarily of lightening and other electrical discharges and phenomena. Geothermal prospecting can be performed by detecting variations in the naturally occurring electromagnetic radiation from thunderstorms or other phenomena. The detection and measurement of short term variations in the earth's magnetic field for geothermal prospecting is described in U.S. Pat. No. 3,126,510 issued to McLaughlin.

Prospecting can also be performed by comparing the simultaneous variations of the underground electric field and magnetic field to which the circulation of the telluric currents give rise. This comparison of electric field and magnetic field requires the use of electrodes to measure the internal telluric currents in the magnetic field according to Cagniard, U.S. Pat. No. 2,677,801. The solar alternating current is distinguishable over telluric currents for many reasons. Firstly, telluric currents are usually direct currents. Secondly, telluric currents occur only within the earth whereas solar alternating currents eminate from the earth. Thirdly, telluric currents are inconsistent and are not based on ionic impingement of the solar winds. Solar alternating current is based on ionic impingement and has predictable time variations due to its constant directivity (vertical), depth and diurnal character.

In summary, the prior art teaches geothermal prospecting which utilizes variations in the naturally occurring electrostatic potential gradient (Sayer), alternations in the earth's electromagnetic field (Slichter), short term variations in the earth's magnetic field (McLaughlin) and simultaneous variations of the underground electric field and magnetic field (Cagniard). These prior art techniques are in contrast to the present invention which utilizes the vertical alternating current of the earth and frequency modulations due to the alternating electrical current resonance phenomena in the earth.

SUMMARY OF THE INVENTION

It is an object of the present invention to disclose an improved method for identifying the type and size of a subsurface deposit as well as man-made objects and the location of the deposit or object through comparative recordation and analysis of the vertical alternating electrical currents and the modulation of the alternating current frequency spectrum due to the resonance phenomena emanating from the earth.

It is a further object of this invention to enable the accurate inventory of all major deposits in an area by the combined use of amplitude comparison of vertical alternating electrical current coupled with an empirically derived computer program which will provide specific identification of the subsurface deposits due to the recording and recognizance of alternating electrical current resonance in the earth.

Another object of this invention is to evaluate and locate the extent of subsurface man-made objects such as pipelines and historical artifacts.

Another object of this invention is to provide an alternate to the magnetic compass as a means of determining a heading reference. This is possible since the solar alternating current produces a stronger energy level when the antenna is oriented east/west and a lesser signal when oriented north/south.

It is a further object of this invention to provide a method for geophysical prospecting which is applicable to the location of oil and gas deposits underground and under the oceans in order to improve the commercial success rate of oil and gas drilling.

The disclosed method of geophysical prospecting includes the steps of monitoring the solar wind activity, traversing a predetermined region of the earth to be prospected when the solar activity is found to be above the given amount, measuring local variations which occur in the amplitude, frequency and frequency modulations of the vertical electric alternating current leakage (defined as the solar alternating current) emanating from the earth's surface and recording these measurements for correlation to determine subsurface anomalies.

BRIEF DESCRIPTION OF THE DRAWING

These and other objects and features of the invention will become apparent to those skilled in the art by referring to the accompanying drawing in which a cross-section of the surface/atmosphere interface is shown in correlation with data obtained by the method of the invention.

DETAILED DESCRIPTION OF THE INVENTION

As a poor conductor, a deposit, such as oil, results in an ionic "shadow", a good conductor deposit such as iron ore, would result in a "focusing" effect. Just as light in the visible spectrum permits intelligence gleaning through frequency modulations and resulting color differentials, the electric vertical current leaking from the earth is also made up of a spectrum of frequencies which are modulated through electrical resonance in unique ways by specific deposits thus enabling remote identification of surface and subterranean anomalies.

Anomalous electrical activity from various magnetospheres fall into two categories. The first case is an anomalous object which moves within a magnetosphere with resulting electrical changes and the second case is the observed electrical anomalies from apparent stationary conductive anomalies within the sphere of the particular magnetosphere.

Usually, the forces putting electrical energy into the earth and the release mechanism which allows distributive leakage are relatively benign, i.e. the leakage at any given point on the earth, while higher at conductive areas and lower over less conductive areas, overall remains weak. However, when a major anomaly occurs, as in the case of a major earthquake, massive currents are released as evidenced above when the requisite solar activity exists.

Therefore, a man-made conductive anomaly, like a steel sphere, if placed below the surface, will result in an increased local electrical leakage as all previous examples of observed conductive anomalies occurring within numerous magnetospheres produced alterations of electric current flow. In such a controlled experiment, both the direct change of current flow could be measured relative to the surrounding areas and the numerous secondary effects one traditionally observes with electric current alterations could also be monitored and observed.

The result is that the phase relationships existing in the electric current are modified by the steel sphere. If this change of electric current phase relationships are observed under water, it appears as a modulation of existing electrical noise. If a phase change above the surface is monitored, the basic RF carrier from the existing current becomes a modulated RF in close proximity to the steel sphere. If the vertical alternating current leakage to the side of and directly above the steel sphere is measured, the current flow above the sphere is higher. If relative humidity along with increased current flow is measured, a local increase in relative humidity results. If local relative humidity increases, remote RF energy is both forward scattered at times and even back scattered if the local humidity change was great enough. Of course, both a temperature change in the water above the submerged sphere as well as a change in the I.R. characteristic of the surface would also be expected. Whether the temperature and I.R. emissivity increases or decreases would depend on the direction of the current. A corresponding increase/decrease in conductivity would also result.

Solar winds generally result in a multi-frequency, high energy ionic impingement at the terrestrial poles of the earth. This ionic impingement causes the ions in turn to leak from non-pole areas in a weak, low noise signal which is clearly measurable resulting in the residence phenomena. The frequency, amplitude and resonant frequency modulation of the signal provide data which indicates information regarding the subsurface or surface anomalies through which the signal passes and which permits the location and identification of the surface or subsurface anomalie. This is due to the fact that the subsurface anomalies will provide varying amplitude, frequency and frequency resonance modulation dependent upon the ionic occulation or conduction properties of the anomaly. Ionic conduction variations are dependent upon the extent of the area and size of the anomalies as well as the type of material from which the anomalies are composed. Correlation of this information with the electrical resonance allows the determination of the specific substance identity, composition and size.

The sensing, recording and analysis of variations in the earth's vertical alternating electrical current and modulations in the alternating current spectrum due to alternating electrical current resonance of natural or man-made objects can be accomplished by the disclosed method. The method is equally applicable to surface and above surface observations. The disclosed invention employs the variations in the vertical alternating electrical current emanating from the earth (called the solar alternating current of the earth and which as explained above is in fact a current having a dc level and a frequency characteristic) and the observed modulations in its frequency spectrum resulting from electrical resonance phenomena to provide location and identification of man-made and natural subsurface objects and/or deposits. This is in contrast to the electrostatic potential gradient changes which, by definition, is a direct current phenomena as used by Sayer, discussed above. The invention is not dependent upon the electromagnetic radiation or variations of electromagnetic radiation as taught by Slichter above, and is not dependent upon the short term variations of the earth's magnetic field as noted above by McLaughlin. In addition, the use for electrodes and the utilization of telluric currents or magnetic fields and variations thereto as taught by Cagniard above is not employed because the present invention can measure the solar alternating electric current variations through the conduction of the atmosphere as well as the surface itself.

The disclosed method has an unlimited number of applications including the prospecting of the entire surface of the land as well as the sea. It can be applied to the location of a specific subsurface deposit or mineral or can be used to determine the location of a man-made object such as a tank which is below the surface. Finally, specific application to the prospecting of oil, gas and minerals is the most obvious application of the method.

DESCRIPTION OF THE PREFERRED EMBODIMENT

Referring to the accompanying drawing, the lower portion of the FIGURE is a cross-section of the surface/atmosphere interface. Reference character 1 generally refers to a conducting anomalie which appears under the surface. Reference character 3 refers to a subsurface conducting anomalie whereas reference characters 2 and 4 refer to subsurface and underwater non-conducting anomalies.

The upper part of the drawing includes graphs which correlate simulated data which would result from the performance of the method described herein. The atmosphere above a predetermined region of the earth which is to be prospected is first traversed. This step in the method can be accomplished by any convenient vehicle such as aircraft. During the traverse, local variations which occur in a vertical alternating current leakage due to an ionic impingement of solar wind on the earth, which is herein referred to as the solar alternating current, is measured. This measurement can be accomplished by any apparatus which allows the measurement of vertical root mean square (RMS) or average alternating current depicted as amplitude occurring between the earth and the atmosphere in a range of approximately 1-10 millivolts. The spectral resonances depicted are measured in 1 Hz through 1 Mega Hz. For example, U.S. Pat. Nos. 3,849,722 and 3,701,940 describe apparatus to be used in prospecting for determining the complex electric field generated when alternating current is induced into the earth. Such apparatus could be used by one skilled in the art to measure the solar alternating current occurring in the atmosphere above a predetermined region of the earth as it is traversed.

The next step in the method includes the recording of the measurements in correlation with the spatial relation of the point of the measurement to determine significant measurements indicative of surface and subterranean anomalies. Recording the measurements can be accomplished by any recording apparatus which is connected to the sensing apparatus used to measure the local variations. In the alternative, the recording could be accomplished by an individual taking periodic readings. The measurements can be correlated with the spatial relation of the point of the measurement by such techniques as described in U.S. Pat. No. 3,976,937 which discloses an apparatus for recording sensor positions by the use of aircraft. The determination of significant measurements indicative of surface and subterranean anomalies would require the correlation of data with the comparison of prospecting results by the use of a computer or other means. In the alternative, U.S. Pat. No. 4,041,372 teaches a method of deriving parameters relative to subsurface strata.

An aircraft is the preferred medium for searching according to this described method since it provides the highest search rate at the lowest cost. A trailing wire antenna can be towed from the aircraft. This trailing wire serves as an antenna and is attached to the amplitude/frequency processor which is used to perform the measuring step of this invention. The other side of the processor is grounded to the air frame, the intervening atmosphere completing the circuit to the earth. This produces a time rate of change measurements. An alternative antenna which will sense solar alternating current flow may also be used.

As shown in the upper portion of the drawing, the measurement of the solar alternating current would include the measurement of the frequency, amplitude and the frequency resonance modulation of the solar alternating current. Considering the simulated data appearing in the drawing, reference character 5 generally refers to the full frequency RMS value of the solar alternating current amplitude graph which may be derived by the performance of the disclosed method. It can be seen by a comparison of the graph to the anomalies 1, 2, 3 and 4 that the solar alternating current amplitude is anticipated to be above a given mean level 5 *m* when recorded over conducting anomalies 1 and 3 and below the given level 5 *m* when recorded over non-conducting anomalies 2 and 4. The specific differential of the solar alternating current amplitude over the mean level indicates information regarding the type, amount and area extent of the anomalie. This data would be used in conjunction with the solar alternating frequency resonance data. The solar alternating current frequency and frequency resonance modulation would be measured at a series of different frequencies a, b, c, d . . . z. The anticipated range varies from 1 Hertz to 1 Mega Hirtz. As the current amplitude variation enables the observer to determine, for example, information regarding the area of the deposit, the solar alternating current frequency resonance enables the observer to identify specific aspects of the deposit through the establishment of empirical data. For example, it would be anticipated that certain non-conducting anomalies would provide certain modulated frequency patterns such as shown by reference characters 2*a* and 4*a* at frequency level a whereas these patterns would not be provided by conducting anomalies. On the other hand, certain non-conducting anomalies would not effect certain frequency ranges and only a specific type of a non-conducting anomalie would result in the measurement within a specific frequency range. For example, frequency d only shows a reaction from the non-conducting anomalie 4 as indicated by reference character 4*d*. This type of evidence would also be similarly applicable to conducting anomalies as shown by frequency b wherein only conducting anomalie 3 provides a reaction as shown by reference character 3*b*.

Certain frequencies, such as frequency c, would show a reaction to all conducting anomalies as depicted by reference characters 1*c* and 3*c*. ·

Due to the fact that the solar alternating current is a result of the vertical alternating current leakage from the ionic impingement of the solar wind on the earth, it is advisable that the solar activity causing such ionic impingement be monitored in order to enhance the measurement process. The monitoring of solar activity further enables elimination of interfering data which may be due to telluric or other extraneous currents which are existing in the earth. The solar activity can be monitored by any known technique ranging from visual observation of auroral strength or sun spot activity to the measurement of gamma, soft X-ray and other radiation eminating from the sun. The data is mainly derived from satellites In summary, when solar activity is high, the more conductive deposits cause a localized increase in the solar alternating current flow (ionic occulation). The total data abstracted from such anomalies will produce a unique pattern. By recording both the current changes and the modulation of the frequency spectrum, both identity and location of subsurface deposits or other anomalies becomes possible with a precision and low cost unequaled by any other methods.

What is claimed is:

1. A method of geophysical prospecting for locating and evaluating surface or subsurface anomalies of the earth comprising the steps of:
    (a) traversing, by at least one pass, generally horizontal with earth's surface, a predetermined region of the earth to be prospected;
    (b) measuring, during step (a), local variations which occur in an alternating component of a vertical current having a frequency characteristic which emanates from the earth's surface in said predetermined region;
(c) recording the measurements; and
(d) correlating said measurements as a function of a spatial relationship between the variations measured in step (b) and points in said predetermined region being prospected to provide an indication of said surface and subterranean anomalies.

2. The method of claim 1 further comprising the step of monitoring local variations which occur in a frequency of said vertical current emanating from the earth.

3. The method of claim 2 further comprising the step of measuring local variations which occur in an amplitude of said vertical current emanating from the earth.

4. The method of claim 1 further comprising the step of measuring local variations which occur in an amplitude of said vertical current emanating from the earth.

5. The method of claim 4 further comprising the step of measuring local variations which occur in a frequency modulation of said vertical current emanating from the earth.

6. The method of claim 1 further comprising the step of measuring local variations which occur in a frequency modulation of said vertical current emanating from the earth.

7. The method of claim 6 further comprising the step of measuring local variations which occur in said frequency characteristic of said vertical current emanating from the earth.

8. The method of claim 7 further comprising the step of measuring local variations which occur in an amplitude of said vertical current emanating from the earth.

9. The method of claim 1 further comprising the step of monitoring solar activity and performing the step of traversing when the solar activity is above a predetermined level.

10. The method of claim 8 further comprising the step of monitoring the solar activity and performing the step of traversing when the solar activity is found to be above a predetermined level.

11. A method of detecting surface or subsurface anomalies of the earth comprising the steps of:
(a) traversing, in a direction generally parallel to the surface, a predetermined region of the surface of the earth;
(b) detecting, during step (b), any variations which occur in an alternating component of a vertical current, having a frequency characteristic, which flows through a space above said predetermined region;
(c) correlating said detected variations, as a function of a spatial relation between the variations detected and points in said predetermined region, to provide an indication of any surface or subsurface anomalies.

12. The method of claim 11 wherein said step of correlating provides an indication of a location in said region of said anomalies.

* * * * *